United States Patent
Nakaike et al.

(10) Patent No.: US 11,907,694 B2
(45) Date of Patent: Feb. 20, 2024

(54) MEMOIZING MACHINE-LEARNING PRE-PROCESSING AND FEATURE ENGINEERING

(71) Applicant: INTERNATIONAL BUSINESS MACHINES CORPORATION, Armonk, NY (US)

(72) Inventors: Takuya Nakaike, Yokohama (JP); Motohiro Kawahito, Sagamihara (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 17/551,746

(22) Filed: Dec. 15, 2021

(65) Prior Publication Data
US 2023/0185552 A1  Jun. 15, 2023

(51) Int. Cl.
*G06F 8/41* (2018.01)
*G06N 20/00* (2019.01)

(52) U.S. Cl.
CPC ........... *G06F 8/4441* (2013.01); *G06N 20/00* (2019.01)

(58) Field of Classification Search
CPC ............................ G06F 8/40–51; G06N 20/00
See application file for complete search history.

(56) References Cited

U.S. PATENT DOCUMENTS

| | | | |
|---|---|---|---|
| 9,740,496 B2 * | 8/2017 | Bose ..................... | G06F 9/3832 |
| 2015/0074381 A1 * | 3/2015 | Bose ..................... | G06F 9/3867 |
| | | | 712/220 |
| 2018/0004835 A1 * | 1/2018 | Piechowicz ............ | G06F 16/20 |
| 2018/0025092 A1 | 1/2018 | Aharonov et al. | |

OTHER PUBLICATIONS

Sandhupatla, Amruth, et al. "Faster convolutional neural network training via approximate memoization", Doctoral dissertation, University of British Columbia, The Faculty of Graduate and Postdoctoral Studies. Oct. 2018, pp. 1-80.

(Continued)

*Primary Examiner* — Todd Aguilera
(74) *Attorney, Agent, or Firm* — Tutunjian & Bitetto, P.C.; Robert Richard Aragona

(57) ABSTRACT

A method creates a table of keys and values. Each key is an element of an input array which is an input of a machine-learning pre-processing pipeline, and each value is an output of the pipeline. The method measures (1) a hit rate H to the memo table, (2) an average time $T_{table}$ to look up the table, (3) an average time $T_{pipeline}$ to execute the pipeline, and (4) a threshold $T_{elements}$ on a number of elements of the input array. The method looks up the value in the table by using an element of the input array as a key when $T_{pipeline} \times H > T_{table}$ and the number of elements in the input array is less than $T_{elements}$. The method calls the pipeline in place of the lookup for all of the remaining elements in the input array when the value is not in the table.

20 Claims, 7 Drawing Sheets

(56) References Cited

OTHER PUBLICATIONS

Zhang, Guowei, et al. "Leveraging caches to accelerate hash tables and memoization", InProceedings of the 52nd Annual IEEE/ACM International Symposium on Microarchitecture. Oct. 12, 2019, pp. 440-452.
Rossanigo, Ariel, et al. "Sklearn-pandas", https://github.com/. Aug. 1, 2021, pp. 1-13.
Anonymous. "IEEE-CIS Fraud Detection", IEEE Computational Intelligence Society. Sep. 2019, pp. 1-2.
Boididou, Christina, et al. "Python Memoization to Facilitate MachineLearning Results Delivery", Good Audience. Sep. 15, 2018, pp. 1-4.
Sharma, Shubham, et al. "Step by Step Guide to Memoization in Java for Machine Learning", dlesAI. Aug. 28, 2020, pp. 1-4.
Anonymous. "pandas: powerful Python data analysis toolkit", Wes McKinney and the Pandas Development Team. Aug. 15, 2021, pp. 1-3509.

\* cited by examiner

```
if len(input_array) < T_elements:
    for i in range(len(input_array)):
        if input_array[i] in memo_table:
            input_array[i] = memo_table[input_array[i]]
        else:
            input_array[i:len(input_array)] = pipeline.transform(input_array[i:len(input_array)])
            break
else:
    input_array = pipeline.transform(input_array)
```

FIG. 5

```
freq = {}
start = time.time()
for e in input_array:
    freq[e] += 1 # Measure frequency
end = time.time()
freq_sorted = sorted(freq.items(), key=lambda x:x[1], reverse=True) # Sort keys and values according to the frequency
for key, freq in freq_sorted:
    ratio = freq / len(input_array)
    if ratio > 0.05: # 0.05 is a threshold
        H += ratio
$T_{table}$ = (end − start) / len(input_array)
```

MEMOIZING MACHINE-LEARNING PRE-PROCESSING AND FEATURE ENGINEERING

BACKGROUND

The present invention generally relates to computer processing systems, and more particularly to memoizing machine learning pre-processing and feature engineering.

Feature engineering and data pre-processing are essential to improve the accuracy of machine learning. Feature learning involves creating new features from existing features. Data pre-processing involves imputing missing values, encoding categorical features to numerical features, scaling numerical features, and so forth.

Memoization is an optimization technique used primarily to speed up computer programs by storing the results of expensive function calls and returning the cached result when the same inputs occur again. However, feature performing and data pre-processing can be performance bottlenecks for inferencing, especially for real-time inferencing.

Hence, there is a need for memoizing machine-learning pre-processing and feature engineering.

SUMMARY

According to aspects of the present invention, a computer-implemented method is provided for memoizing data transformation patterns in machine-learning pre-processing. The method includes, in a training phase, creating a memo table of keys and values. Each of the keys is an element of an input array which is an input of a machine-learning pre-processing pipeline, and each of the values is an output of the machine-learning pre-processing pipeline. The method further includes, in the training phase, measuring (1) a hit rate H to the memo table, (2) an average time $T_{table}$ to look up the memo table, (3) an average time $T_{pipeline}$ to execute a machine-learning pre-processing pipeline, and (4) a threshold $T_{elements}$ on a number of elements of the input array to determine whether to perform or bypass a memo table lookup. The method also includes, in an inferencing phase, looking up the value in the memo table by using an element of the input array as a key when $T_{pipeline} \times H > T_{table}$ and the number of elements in the input array is less than $T_{elements}$. The method additionally includes, in the inferencing phase, calling, by a processor device, the machine learning pre-processing pipeline in place of the memo table lookup for all of the remaining elements in the input array when the value is not found in the memo table.

According to other aspects of the present invention, a computer program product is provided for memoizing data transformation patterns in machine-learning pre-processing. The computer program product includes a non-transitory computer readable storage medium having program instructions embodied therewith. The program instructions are executable by a computer to cause the computer to perform a method. The method includes, in a training phase, creating, by a processor device, a memo table of keys and values. Each of the keys is an element of an input array which is an input of a machine-learning pre-processing pipeline, and each of the values is an output of the machine-learning pre-processing pipeline. The method further includes measuring, by the processor device, (1) a hit rate H to the memo table, (2) an average time $T_{table}$ to look up the memo table, (3) an average time $T_{pipeline}$ to execute a machine-learning pre-processing pipeline, and (4) a threshold $T_{elements}$ on a number of elements of the input array to determine whether to perform or bypass a memo table lookup. The method also includes, in an inferencing phase, looking up, by the processor device, the value in the memo table by using an element of the input array as a key when $T_{pipeline} \times H > T_{table}$ and the number of elements in the input array is less than $T_{elements}$. The method additionally includes, in the inferencing phase, calling, by the processor device, the machine learning pre-processing pipeline in place of the memo table lookup for all of the remaining elements in the input array when the value is not found in the memo table.

According to yet other aspects of the present invention, a computer processing system is provided for memoizing data transformation patterns in machine-learning pre-processing. The computer processing system includes a memory device for storing program code. The computer processing system further includes a processor device operatively coupled to the memory device for running the program code, in a training phase, to create a memo table of keys and values. Each of the keys is an element of an input array which is an input of a machine-learning pre-processing pipeline, and each of the values is an output of the machine-learning pre-processing pipeline. The processor device further runs the program code, in the training phase, to measure (1) a hit rate H to the memo table, (2) an average time $T_{table}$ to look up the memo table, (3) an average time $T_{pipeline}$ to execute a machine-learning pre-processing pipeline, and (4) a threshold $T_{elements}$ on a number of elements of the input array to determine whether to perform or bypass a memo table lookup. The processor device also runs the program code, in an inferencing phase, to look up the value in the memo table by using an element of the input array as a key when $T_{pipeline} \times H > T_{table}$ and the number of elements in the input array is less than $T_{elements}$. The processor device additionally runs the program code, in the inferencing phase, to call the machine learning pre-processing pipeline in place of the memo table lookup for all of the remaining elements in the input array when the value is not found in the memo table.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 5 is a diagram showing exemplary pseudocode for an inferencing phase, in accordance with an embodiment of the present invention;

FIG. 6 is a diagram showing exemplary pseudocode for measuring $T_{table}$, in accordance with an embodiment of the present invention.

DETAILED DESCRIPTION

Embodiments of the present invention are directed to memoizing machine learning pre-processing and feature engineering.

Real-time inferencing can apply feature engineering and data pre-processing to a single-row dataframe (e.g., a single transaction record). A dataframe is a two-dimensional (2D) array of rows and columns.

Embodiments of the present invention improve the performance of feature engineering and machine learning data pre-processing for a single-row dataframe by memoizing the inputs and outputs for a pipeline of feature engineering and data pre-processing functions (i.e., pre-processing pipeline).

General memoization involves memoizing a value for scalar arguments of a function. In contrast, embodiments of the present invention memoize a value for each element in an input array. In an embodiment, each element in the input array is an argument of a function.

Embodiments of the present invention stop looking up a memo table for all of the remaining elements when a value is not found in the memo table (i.e., the case of a memo-table miss).

Embodiments of the present invention avoid looking up a memo table when the lookup benefit is small (i.e., the number of elements in an array is larger than $T_{elements}$, as described further herein).

Figure 1:
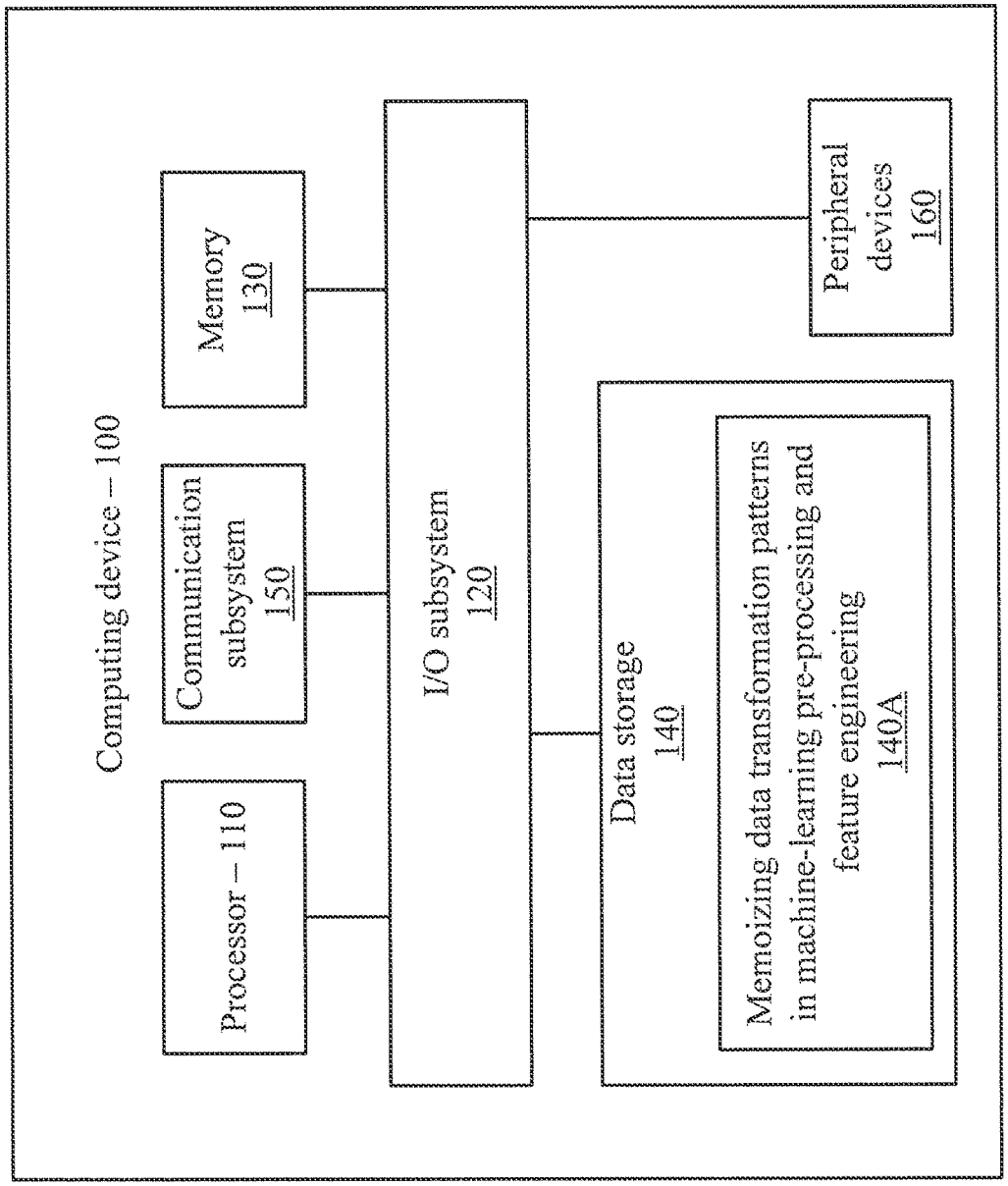
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to memoize data transformation patterns in machine-learning pre-processing and feature engineering.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for memoizing data transformation patterns in machine-learning pre-processing and feature engineering. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
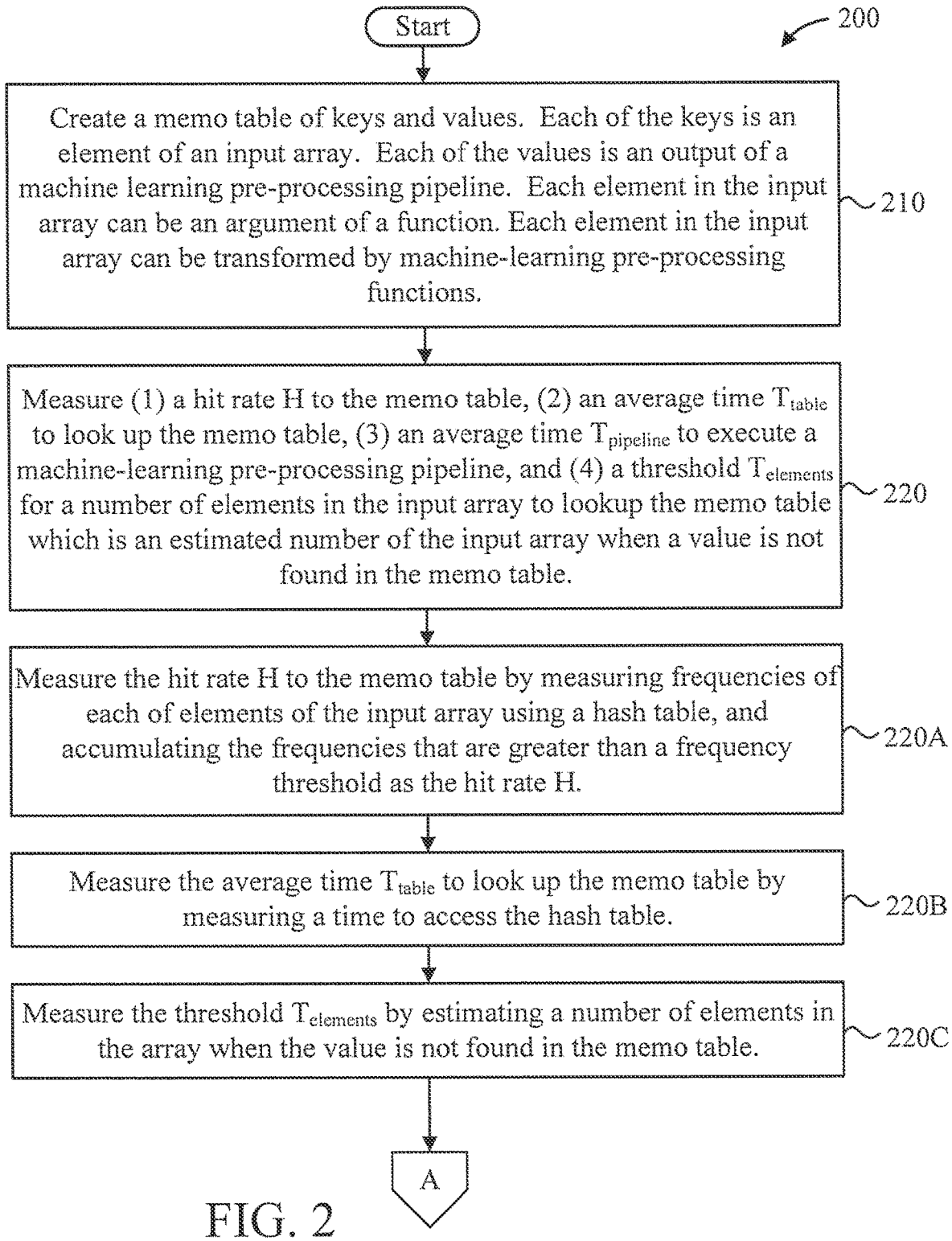
FIGS. 2-3 are block diagrams showing an exemplary method for memoizing machine-learning pre-processing and feature engineering, in accordance with an embodiment of the present invention.
Figure 3:
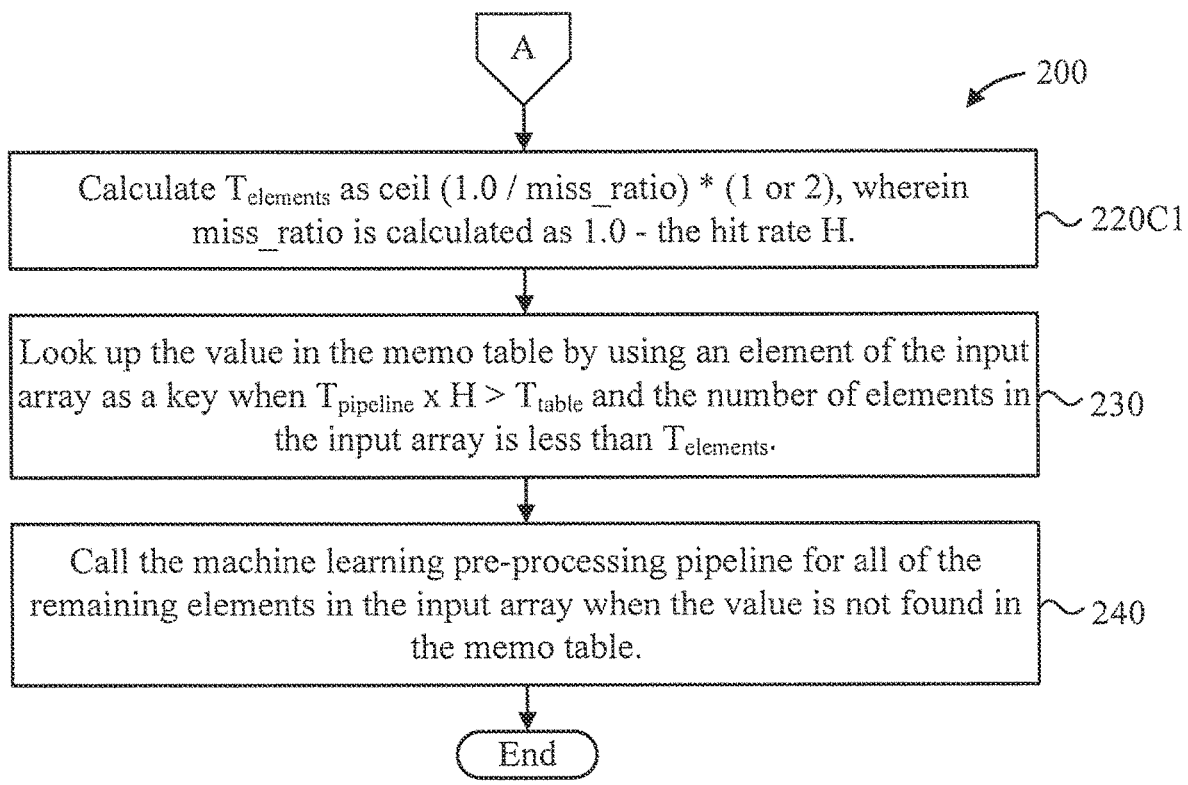

These and other variations of a hardware processor subsystem are also contemplated in accordance with embodiments of the present invention FIGS. 2-3 are block diagrams showing an exemplary method 200 for memoizing machine-learning pre-processing and feature engineering, in accordance with an embodiment of the present invention.

Blocks 210 through 220 correspond to a training phase 291 and blocks 230 through 240 correspond to an inference phase 292.

At block 210, create a memo table of keys and values. Each of the keys is an element of an input array. Each of the values is an output of a machine learning pre-processing pipeline. In an embodiment, each element in the input array can be an argument of a function. In an embodiment, each element in the input array can be transformed by machine-learning pre-processing functions.

At block 220, measure (1) a hit rate H to the memo table, (2) an average time $T_{table}$ to look up the memo table, (3) an average time $T_{pipeline}$ to execute a machine-learning pre-processing pipeline, and (4) a threshold $T_{elements}$ for a number of elements in the input array to lookup the memo table which is an estimated number of the input array when a value is not found in the memo table. In other words, $T_{elements}$ represents when a miss can occur. If $T_{elements}$ is 3, then a miss can occur at the third element of an input array. Since the present invention stops looking up the memo table when a miss occurs, the benefit is small when the size of an input array is larger than $T_{elements}$. Therefore, $T_{elements}$ t is used to estimate the benefit of the present invention. If the size of an input array is larger than $T_{elements}$, the present invention does not look up the memo table at all.

In an embodiment, block 220 can include blocks 220A through 220C.

At block 220A, measure the hit rate H to the memo table by measuring frequencies of each of elements of the input array using a hash table, and accumulating the frequencies that are greater than a frequency threshold as the hit rate H.

At block 220B, measure the average time $T_{table}$ to look up the memo table by measuring a time to access the hash table.

At block 220C, measure the threshold $T_{elements}$ by estimating a number of elements in the array when the value is not found in the memo table.

In an embodiment, block 220C can include block 220C1.

At block 220C1, calculate $T_{elements}$ as ceil (1.0/miss_ratio) *(1 or 2), wherein miss_ratio is calculated as 1.0–the hit rate H. 1 is selected for multiplication for conservative memoization and 2 (or a number greater than 2) is selected for multiplication for optimistic memoization.

At block 230, look up the value in the memo table by using an element of the input array as a key when $T_{pipeline} \times H > T_{table}$ and the number of elements in the input array is less than $T_{elements}$.

At block 240, call the machine learning pre-processing pipeline for all of the remaining elements in the input array when the value is not found in the memo table.

Figure 4:
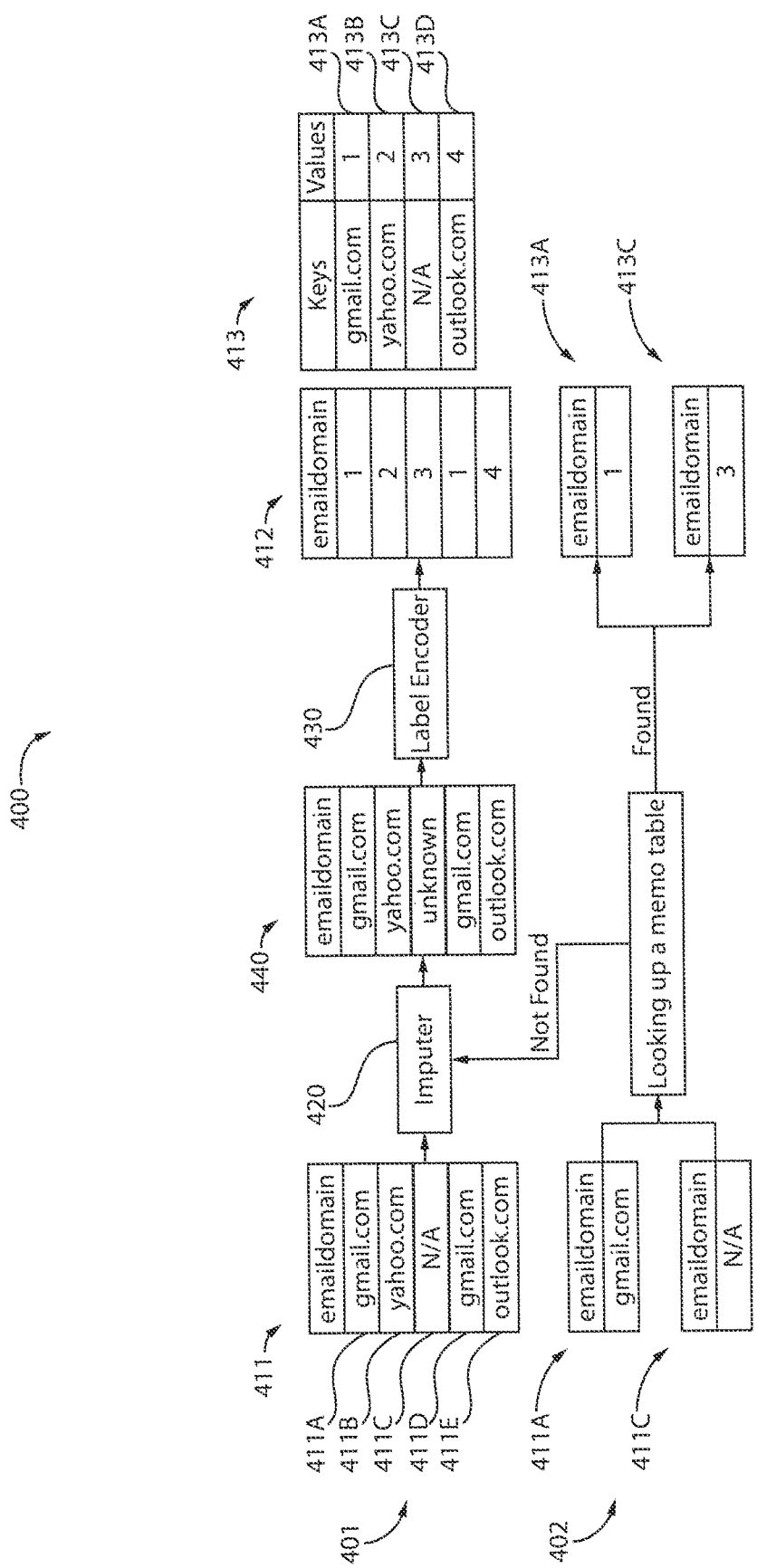
FIG. 4 is a diagram showing an exemplary system for memoizing machine-learning pre-processing and feature engineering, in accordance with an embodiment of the present invention.

FIG. 4 is a diagram showing an exemplary system 400 for memoizing machine-learning pre-processing and feature engineering, in accordance with an embodiment of the present invention.

The system 400 involves a training phase 401 and an inference phase 402.

The training phase 401 creates a memo table 413. The memo table 413 includes keys and values. Each of the keys is an element in an input array. In an embodiment, the input array is an input to the machine learning pipeline. Each of the values is an output of a machine-learning pre-processing pipeline. Here, each of the keys is an email domain, where there are four email domains as follows: gmail; yahoo.com; N/A; and outlook.com.

Also, the training phase 401 measures (1) a hit rate H to the memo table 413, (2) an average time $T_{table}$ to look up the memo table 413, (3) an average time $T_{pipeline}$ to execute a pre-processing pipeline, and (4) a threshold $T_{elements}$ for a number of elements in an input array to lookup the memo table 413 which is an estimated number of the input array when a value is not found in the memo table 413.

The inference phase 402 looks up the memo table 413 by using an element of an input array as a key if $T_{pipeline} \times H > T_{table}$ and the number of elements in the input array is less than $T_{elements}$. Otherwise, a machine-learning pre-processing pipeline is called for all of the remaining elements in the input array.

The system 400 involves an input array 411, an output array 412, a memo table 413, an imputer, 420, and a label encoder 430.

The input array 411 stores email domain values 411A though 411E as a feature for machine learning. Since most of machine-learning models accept only numerical values, string values are converted into numerical values in pre-processing operations explained below. Here, the input array includes 1 column of email domain values with 5 rows as follows from top to bottom: gmail.com; yahoo.com; N/A/; gmail.com; and outlook.com.

The output array 412 stores numerical values inputted into a machine-learning model. Here, the output array includes 1 column of email domain values with 5 rows as follows from top to bottom: 1; 2; 3; 1; and 4.

The imputer 420 fills in "N/A" values with the value "unknown" or some other value to provide a version 440 of the input array with imputed values.

The label encoder 430 converts categorical values into numerical vales by encoding the keys into corresponding values in the output array 412. The label encoder 430 encodes as follows:

gmail→1
yahoo→2
unknown→3
outlook→4

The memo table 414 is created by associating each of the numerical values (1 through 4, 413A through 413D) encoded by the label encoder 430 with a corresponding key (gmail.com, yahoo.com, N/A, and outlook.com).

For the inferencing phase 402, values 411A and 411C from an input array are looked up in the memo table when $T_{pipeline} \times H > T_{table}$ and the number of elements in the input array is less than $T_{elements}$. Otherwise, for the inferencing phase 402, a pre-processing pipeline is called for all of the remaining elements in the input array when the value from the input array is not found in the memo table ("Not found" branch in the inference phase 402). Memo table elements 413A and 413C are returned.

The following definitions apply:
$T_{table}$=average time to access the memo table
$T_{pipeline}$=an average time to call pre-processing functions
H=hit ratio to the memo table
$T_{elements}$=ceil (1.0/miss_ratio)

FIG. 5 is a diagram showing exemplary pseudocode 500 for an inferencing phase, in accordance with an embodiment of the present invention.

FIG. 6 is a diagram showing exemplary pseudocode 600 for measuring $T_{table}$, in accordance with an embodiment of the present invention.

Figure 7:
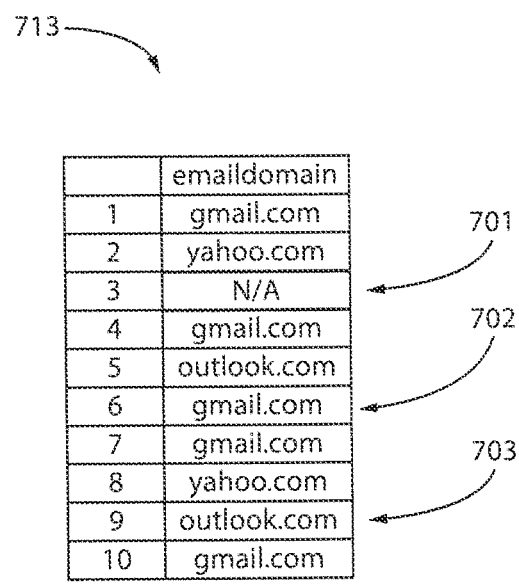
FIG. 7 is a diagram showing exemplary miss positions and corresponding uses or non-uses of a memo table, in accordance with an embodiment of the present invention.

FIG. 7 is a diagram showing exemplary miss positions 701-703 and corresponding uses or non-uses of a memo table 713, in accordance with an embodiment of the present invention.

Three exemplary miss positions 701, 702, and 703 are shown.

If a miss occurs at miss position 701, then only two elements are beneficial and the memo table 713 is not used. That is, $T_{benefit} = T_{pipeline} * H$.

If a miss occurs at miss position 702, then half of the elements are beneficial and the memo table 713 is used.

If a miss occurs at miss position 703, then most of the elements are beneficial and the memo table 713 is used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for memoizing data transformation patterns in machine-learning pre-processing, comprising:
   in a training phase:
   creating a memo table of keys and values, where each of the keys is an element of an input array which is an input of a machine-learning pre-processing pipeline, and each of the values is an output of the machine-learning pre-processing pipeline; and
   measuring (1) a hit rate H to the memo table, (2) an average time $T_{table}$ to look up the memo table, (3) an average time $T_{pipeline}$ to execute a machine-learning pre-processing pipeline, and (4) a threshold $T_{elements}$ on a number of elements of the input array to determine whether to perform or bypass a memo table lookup;
   in an inferencing phase:
   looking up a value in the memo table by using an element of the input array as a key in response to determining that $T_{pipeline} \times H > T_{table}$ and the number of elements in the input array is less than $T_{elements}$; and
   calling, by a processor device, the machine learning pre-processing pipeline in place of the memo table lookup for all of the remaining elements in the input array in response to determining that the value is not found in the memo table.

2. The computer-implemented method of claim 1, wherein each element in the input array is an argument of a function.

3. The computer-implemented method of claim 1, wherein measuring the hit rate H to the memo table comprises:
   measuring frequencies of each of elements of the input array using a hash table; and
   accumulating the frequencies that are greater than a frequency threshold as the hit rate H.

4. The computer-implemented method of claim 3, wherein measuring an average time $T_{table}$ to look up the memo table comprises measuring a time to access the hash table.

5. The computer-implemented method of claim 1, further comprising determining $T_{elements}$ by estimating a number of elements in the array when the value is not found in the memo table.

6. The computer-implemented method of claim 1, wherein the elements in the input array are transformed by machine-learning pre-processing functions, each of the machine-learning pre-processing functions taking the input array as an argument.

7. The computer-implemented method of claim 1, further comprising imputing missing keys in preparation for transforming categorical values of the input array into numerical values of an output array that is input into the machine-learning pipeline.

8. The computer-implemented method of claim 1, wherein $T_{elements}$ is calculated as ceil (1.0/miss_ratio)*(1 or 2), wherein miss_ratio is calculated as 1.0−the hit rate H, and wherein 1 is selected for multiplication for conversative memoization and 2 is selected for multiplication for optimistic memoization.

9. The computer-implemented method of claim 1, wherein the machine-learning pre-processing comprises performing a feature engineering application to produce a new integrated circuit feature for an integrated circuit chip.

10. The computer-implemented method of claim 9, wherein the new integrated circuit feature comprises an element for a field effect transistor.

11. The computer-implemented method of claim 1, wherein looking up the value in the memo table comprises inputting a single-row dataframe to obtain a machine-learning pipeline output value.

12. A computer program product for memoizing data transformation patterns in machine-learning pre-processing, the computer program product comprising a non-transitory computer readable storage medium having program instructions embodied therewith, the program instructions executable by a computer to cause the computer to perform a method comprising:
  in a training phase:
    creating, by a processor, a memo table of keys and values, where each of the keys is an element of an input array which is an input of a machine-learning pre-processing pipeline, and each of the values is an output of the machine-learning pre-processing pipeline; and
    measuring, by the processor, (1) a hit rate H to the memo table, (2) an average time $T_{table}$ to look up the memo table, (3) an average time $T_{pipeline}$ to execute a machine-learning pre-processing pipeline, and (4) a threshold $T_{elements}$ on a number of elements of the input array to determine whether to perform or bypass a memo table lookup;
  in an inferencing phase:
    looking up, by the processor, a value in the memo table by using an element of the input array as a key when $T_{pipeline} \times H > T_{table}$ and the number of elements in the input array is less than $T_{elements}$; and
    calling, by the processor, the machine learning pre-processing pipeline in place of the memo table lookup for all of the remaining elements in the input array when the value is not found in the memo table.

13. The computer program product of claim 12, wherein each element in the input array is an argument of a function.

14. The computer program product of claim 12, wherein measuring the hit rate H to the memo table comprises:
  measuring frequencies of each of elements of the input array using a hash table; and
  accumulating the frequencies that are greater than a frequency threshold as the hit rate H.

15. The computer program product of claim 14, wherein measuring an average time $T_{table}$ to look up the memo table comprises measuring a time to access the hash table.

16. The computer program product of claim 12, wherein the method further comprises determining $T_{elements}$ by estimating a number of elements in the array when the value is not found in the memo table.

17. The computer program product of claim 12, wherein the elements in the input array are transformed by machine-learning pre-processing functions, each of the machine-learning pre-processing functions taking the input array as an argument.

18. The computer program product of claim 12, wherein the method further comprises imputing missing keys in preparation for transforming categorical values of the input array into numerical values of an output array that is input into the machine-learning pipeline.

19. The computer program product of claim 12, wherein $T_{elements}$ is calculated as ceil (1.0/miss_ratio)*(1 or 2), wherein miss_ratio is calculated as 1.0–the hit rate H, and wherein 1 is selected for multiplication for conversative memoization and 2 is selected for multiplication for optimistic memoization.

20. A computer processing system for memoizing data transformation patterns in machine-learning pre-processing, comprising:
  a memory for storing program code; and
  a processor operatively coupled to the memory for running the program code to:
  in a training phase:
    create a memo table of keys and values, where each of the keys is an element of an input array which is an input of a machine-learning pre-processing pipeline, and each of the values is an output of the machine-learning pre-processing pipeline; and
    measure (1) a hit rate H to the memo table, (2) an average time $T_{table}$ to look up the memo table, (3) an average time $T_{pipeline}$ to execute a machine-learning pre-processing pipeline, and (4) a threshold $T_{elements}$ on a number of elements of the input array to determine whether to perform or bypass a memo table lookup;
  in an inferencing phase:
    look up a value in the memo table by using an element of the input array as a key when $T_{pipeline} \times H > T_{table}$ and the number of elements in the input array is less than $T_{elements}$; and
    call the machine learning pre-processing pipeline in place of the memo table lookup for all of the remaining elements in the input array when the value is not found in the memo table.

\* \* \* \* \*